Dec. 30, 1941.  A. L. STEWART ET AL  2,268,326
TOOL FOR CUTTING GEARS
Filed April 9, 1935
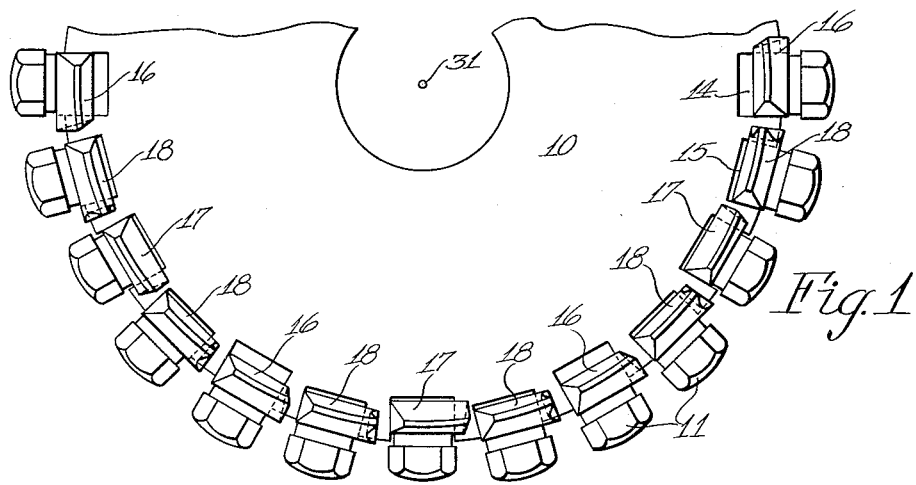
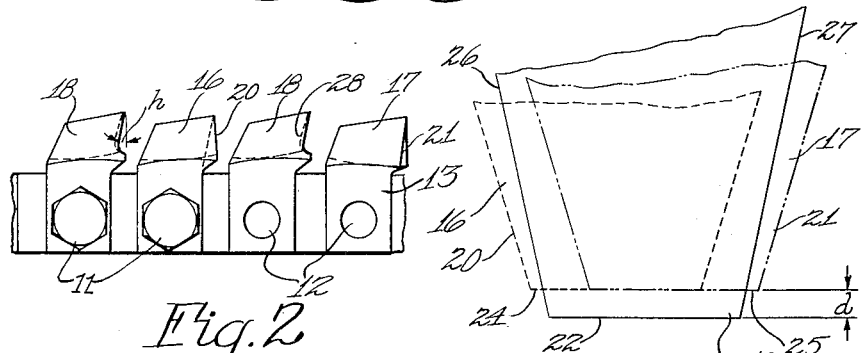
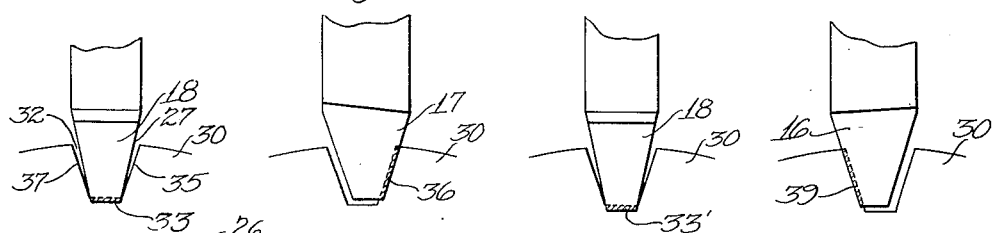
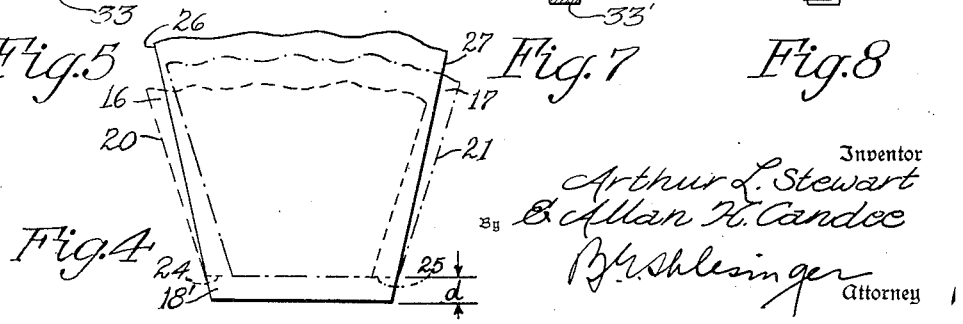
Inventor
Arthur L. Stewart
Allan H. Candee
By B. Schlesinger
Attorney Patented Dec. 30, 1941

2,268,326

UNITED STATES PATENT OFFICE 2,268,326

TOOL FOR CUTTING GEARS

Arthur L. Stewart and Allan H. Candee, Rochester, N. Y., assignors to Gleason Works, Rochester, N. Y., a corporation of New York Application April 9, 1935, Serial No. 15,410

19 Claims. (Cl. 29—105)

The present invention relates to a tool for and method of cutting gears and particularly to a tool for and method of cutting longitudinally curved tooth gears, such as spiral bevel and hypoid gears. In a still more specific aspect, the invention relates to gear-cutters of the face-mill type and to the cutting of gears with such cutters.

The primary object of this invention is to provide a face-mill gear-cutter which, in use, will cut faster, more smoothly and more freely than previous forms of such tools and which will have a longer life.

The invention pertains especially to face-mill roughing cutters for roughing out the tooth slots of a gear blank prior to a finishing operation. Heretofore, such cutters have been provided with blades which cut simultaneously both on a side and in the bottom of a tooth slot. It has been found, particularly where a heavy feed is employed, that is, where the cutter is fed at a fast rate into the blank, that there is a tendency for the chips to adhere to the blades causing "pitting" or "burning" at the tips of the blades and producing a very scratchy tooth surface finish. The "pitting" or "burning" very materially reduces the life of the blades.

It is our theory that the tendency to "pit" or "burn" is due not merely to the thin section of the blade at its tip and to the intense heat generated at the juncture of the top and side cutting edges of the blade, but especially to the tendency of the two chips produced by the side and bottom cuts to crowd into one another and weld onto the blade at its tip under the intense heat produced. Certain it is that the chips tend to adhere to the blades and produce a scratchy finish.

Efforts toward overcoming the tendency of the roughing cutter blades to "pit" or to "burn" and the tendency of the chips to adhere to the blades have been directed at increasing the volume and the pressure of the coolant supply to the blades as they take their cuts. From these efforts, undoubtedly improvements have resulted. Means have been achieved for projecting the stream of coolant more directly at the face and tip of each blade as it takes its cut and the pressure has been increased to an extent to wash away most of the chips before they have an opportunity to adhere to the blades. The problem, however, has not, prior to the present invention, been wholly solved.

We have conceived that if a cutter could be produced in which the side cuts were separated from the tip or bottom cuts so that each blade had to do only side cutting or bottom cutting but not both, excessive heating at the tips of the blades would be avoided and the tendency of the chips to weld onto the blades would be overcome. We have devised, therefore, an entirely new form of face-mill cutter. In our cutter, we divide the burden of the cuts so that certain blades do only side cutting and other blades only bottom cutting. We have found that not only has the tendency toward "pitting" and "burning" been eliminated entirely but that the blades cut more freely. The side cutting blades takes distinctly different chips from the bottom cutting blades and the cutter can be fed into the blank at a higher rate of speed so that greater production can be obtained with a smoother finish.

In the preferred form of cutter, the bottom cutting blades are alternated with the side cutting blades and alternate side cutting blades are further arranged so as to cut, respectively, on opposite sides of a tooth space. The bottom cutting blades are arranged to project beyond the side cutting blades axially of the cutter by an amount at least as great as the distance the cutter is fed into the blank between the cuts of successive blades so that the bottom cutting blades are the only blades that cut in the bottoms of the tooth slots of the blank. The side cutting blades are arranged so that their side cutting edges project radially inwardly or outwardly, as the case may be, depending upon whether the blades are inside or outside cutting blades, beyond the sides of the bottom cutting blades and the pressure angles of the side-cutting blades are greater than the pressure angles of the bottom-cutting blades so that only the side-cutting blades take the cuts on the sides of each tooth slot. The bottom cutting blades have side as well as top clearance to prevent dragging of the sides of such blades against the sides of the tooth slots and so that, after sharpening, they will have the same effective profile as when new. The front faces of the bottom cutting blades are also provided with a "hook" to improve the cutting action of the blades. Our tool is not subject to "pitting" or to "burning," will cut faster and has longer life.

A preferred embodiment of the invention is illustrated in the accompanying drawing in which:

Fig. 1 is a fragmentary plan view of a face-mill gear cutter constructed according to the present invention;

Fig. 2 is a fragmentary developed side view of the cutter showing four successive blades of the cutter and illustrating the relation of the bottom cutting blades to the side cutting blades;

Fig. 3 is a diagrammatic view showing a bottom-cutting blade superimposed upon a pair of opposite side-cutting blades and illustrates the preferred proportions of the side and bottom cutting blades;

Fig. 4 is a diagrammatic view similar to Fig. 3 but showing a still further arrangement of the side-cutting and bottom-cutting blades; and Figs. 5 to 8 inclusive are diagrammatic views illustrating the successive cuts taken in a gear blank by a cutter when the blades are arranged in the manner illustrated in Figs. 1, 2 and 3.

The cutter shown in the drawing comprises a rotary head 10 of usual construction and a plurality of annularly arranged cutting-blades. The cutting blades are secured in the usual manner in slots in the cutter head by bolts 11 which pass through holes 12 drilled in the shanks 13 of the blades and which thread into the cutter head. The cutting portions of the blades project, as usual, beyond one side face of the cutter head in the general direction of the axis of the head. Shims 14 and 15 of suitable size may be provided for adjusting the blades radially of the axis of the head.

In the embodiment of the invention shown in Figs. 1 to 3 inclusive there are a plurality of outside cutting blades 16, a plurality of inside cutting blades 17, and a plurality of bottom cutting blades 18. The bottom cutting blades alternate with the side cutting blades. In fact, the bottom cutting blades alternate with opposite side cutting blades. That is, there is a bottom cutting blade, then an outside cutting blade, then another bottom cutting blade, and then an inside cutting blade as the blades are arranged successively around the cutter head.

The inside and outside cutting blades are of the usual construction. The outside cutting blades are sharpened with a side rake that provides a side cutting edge at the outside of the blade and the inside cutting blades are sharpened with a side rake that provides a cutting edge at the inside of the blade. Pressure angles of the inside and outside cutting blades are selected in accordance with the pressure angles of the opposite sides of the tooth slots to be cut into the gear blank. The distance between the outside cutting edges 20 and the inside cutting edges 21 (Fig. 3) measured radially of the cutter head determines the width of the tooth space to be cut. This can be obtained according to usual practice by shimming the blades. This distance measured across the tips of the outside and inside cutting blades is known as the point-width of the cutter.

The side cutting blades are provided, as usual, with cutting clearance behind their cutting edges so as to cut freely and they also have the usual cutting clearance or relief on their tops. The top relief or clearance is to insure that, after sharpening, the blades will have the same effective cutting profile as when new and it also enables the blades to cut cleanly if they are required to take a slight top-cut.

The bottom-cutting blades 18 are either made of greater height than the side-cutting blades 16 and 17 or are arranged in the cutter head so that their top-cutting edges 22 will extend axially beyond the tips 24 and 25, respectively, of the outside and inside cutting blades a distance $d$ (Fig. 3) which is greater than the distance which the cutter will be fed into a gear blank between cuts of successive blades. The top cutting edges 22 of the blades 18 will, therefore, take the bottom cuts in the tooth spaces of a gear blank being cut and will relieve the tips 24 and 25 of the side-cutting blades of taking any bottoming cuts. The point width of the top edge 22 of the bottom cutting blades is made less than or, at least, no greater than the point width of the side-cutting blades so that the bottom cutting blades 18 will not do any side cutting.

The sides 26 and 27 of the bottom cutting blades 18 have positive pressure angles. Hence, these blades, as clearly shown in Fig. 3 are of truncated V-shape. This shape gives the bottom cutting blades strength. The bottom cutting blades are constructed, however, so that their sides 26 and 27 have smaller pressure angles than the corresponding sides 20 and 21, respectively, of the side cutting blades, as clearly shown in Fig. 3. This is to prevent the bottom cutting blades from taking any side cuts.

The tops of the bottom-cutting blades 18 are, of course, relieved back of the tip cutting edges 22 so as to provide the required cutting clearance. The sides of these blades are also relieved or provided with cutting clearance so that they do not drag along the sides of the tooth space as the blades take their cuts.

The bottom cutting blades are also provided with a front hook, that is, the front face of each blade is inclined rearwardly from the tip to the shank of the blade. This front hook enables the blades to cut more freely. The angle of the front hook is designated at $h$ in Fig. 2. The bottom cutting blades may also be provided with a side rake so that the chips cut thereby will be curled to one side or the other of the blades. The side rake may be to either side of the blades. In Fig. 2, the bottom cutting blades, which are shown, are provided with a side rake in addition to a front hook, the dotted lines 28 designating the inside edges of the front faces of the blades.

Figs. 5 to 8 inclusive show the action of the cutter described in roughing out the tooth slots of a gear. 30 designates a gear blank to be cut. The blank is shown only fragmentarily for the purposes of illustration. In the cutting operation, the cutter is rotated continuously on its axis 31 and simultaneously fed axially into the blank. The blades are shown in Figs. 5 to 8 in the positions which they occupy after the cutter has already been fed some distance into the blank.

In Fig. 5, one of the bottom cutting blades 18 is shown in the action of taking its cut. As this blade moves across the face of the blank, its top cutting edge 22 takes out the chip 33 shown in shaded lines from the bottom of the tooth space 32 of the blank. The sides 26 and 27 of the bottom cutting blade will not cut on the sides of the tooth space because the sides of this blade 18 are of smaller pressure angle than the side cutting edges of the side cutting blades and hence have clearance with reference to the sides of the tooth slot.

The next blade which follows the bottom cutting blade 18 of Fig. 5 is an inside cutting blade 17 (Fig. 6). Since the cutting edge of this blade projects inwardly radially beyond the side 27 of the preceding bottom cutting blade, it will take a cut on the side 35 of the tooth space 32, but since the bottom cutting blade 18 projects axially beyond the tip of the inside cutting blade 17 a greater distance than the distance which the cutter is fed between the time the two successive blades take their cuts, the inside cutting blade will not take a cut in the bottom of the tooth slot. The chip which is removed by the side edge of the inside cutting blade 17 is designated at 36.

The cutter continues to rotate and to be fed into the blank. The next blade to take its cut is a bottom cutting blade as shown in Fig. 7. The cutter has been fed further into the blank and so it removes a new chip 33' from the bottom of the tooth space.

The blade which follows this bottom cutting blade 18 is an outside cutting blade 16. The cutter is fed further into the blank between the time that the preceding bottom cutting blade 18 takes its cut and this blade 16 begins to cut. However, the bottom cutting blade 18 projects beyond the tip of the side cutting blade 16 a distance greater than the amount of this feed and so the side cutting blade 16 does not cut in the bottom of the tooth slot. The side cutting blade 16 simply takes a cut on the side 37 of the tooth slot, the chip removed being indicated in shaded lines at 39 in Fig. 8.

The successive cuts proceed in the fashion shown in Figs. 5 to 8 until the tooth slot has been cut to its full depth. Then the cutter is withdrawn and the blank indexed as in the usual process and then the cutter is fed again into the blank to cut a new tooth space.

In Figs. 6 and 8, the side cutting blades 16 and 17 take slight cuts with their tip edges. The depth cutting in the slot is really done, however, by the bottom-cutting blades 18. The slight top chips cut by the blades 16 and 17 do not overheat these blades and cannot adhere to them. It is possible, of course, to avoid having the side-cutting blades do any tip-cutting. This can be done by making the side-cutting blades of exactly the same point-width as the bottom-cutting blades. Then the side-cutting blades will only cut on the sides of the tooth slots and that by virtue of their greater pressure angle as compared with the pressure angle of the bottom-cutting blades.

Fig. 4 illustrates diagrammatically another embodiment of the invention in which the point-width of the bottom-cutting blades 18' has been increased relatively over the point-width of the bottom-cutting blades 18 shown in Fig. 3. In the embodiment shown in Fig. 4, the point width of the bottom cutting blade 18' is still somewhat less than the point width of the side-cutting blades, and the side-cutting blades will not be relieved entirely of all tip cutting, but the side-edges of the bottom and side-cutting blades will intersect when projected into a common radial plane.

While a particular arrangement of the blades has been illustrated, it will be obvious that our invention is not restricted to the arrangement shown but that various other modifications are possible. The present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A gear cutting tool comprising a rotary head having a plurality of annularly arranged cutting blades secured thereto and extending in the general direction of its axis, alternate blades projecting axially beyond the other blades so as to bottom-cut and alternate blades of the remaining blades having side cutting edges which project inwardly and outwardly, respectively, radially of the axis of the tool beyond the sides of the bottom cutting blades so as to cut on opposite sides of a tooth space and the bottom cutting blades being relieved on both sides and their tips back of their front faces.

2. A gear cutting tool comprising a rotary head having a plurality of annularly arranged cutting blades secured thereto and extending in the general direction of its axis, certain of said blades projecting axially beyond the remainder of said blades so as to bottom-cut, the remainder of said blades having side cutting edges which project radially inwardly and outwardly, respectively, beyond the corresponding sides of the bottom cutting blades so as to side-cut, all of said blades having side surfaces provided with cutting clearance back of their front edges and said bottom cutting blades having sides which are of positive pressure angle but of smaller pressure angle than the pressure angle of the corresponding cutting side surfaces of the remainder of said blades, said bottom cutting blades also having their front faces extending rearwardly from the tips to the shanks of the blades considered in the direction of rotation of the cutter.

3. A gear cutting tool comprising a rotary head having a plurality of annularly arranged cutting blades secured thereto and extending in the general direction of its axis, alternate blades projecting axially beyond the remainder of the blades so as to bottom-cut, and alternate blades of said remainder having side cutting edges which project inwardly and outwardly, respectively, radially beyond the sides of the bottom cutting blades so as to cut on opposite sides of a gear tooth space, all of said blades having cutting clearance on their side surfaces behind their front surfaces and said bottom cutting blades having sides which are of positive pressure angle but of smaller pressure angle than the pressure angle of the corresponding side surfaces of the side cutting blades, said bottom cutting blades also having their front faces extending rearwardly from the tips of the blades to the shanks thereof considered in the direction of rotation of the cutter.

4. A gear cutting tool comprising a rotary head and a plurality of cutting blades which project beyond one side face of the head in the general direction of the axis of the head, alternate blades being bottom cutting blades and the remainder of said blades being alternately outside and inside cutting blades, said bottom cutting blades projecting beyond the other blades in the general direction of the axis of the head and being relieved on opposite sides and their tips back of their front faces and having opposite side surfaces which are of positive pressure angle but whose pressure angles are less than the pressure angles of the corresponding sides of the side cutting blades, the radial distance between opposite side cutting edges of said side cutting blades being at least as great measured in any plane perpendicular to the axis of the cutter as the distance between opposite sides of the bottom cutting blades, and said side cutting blades being relieved back of their side cutting edges and on their tip surfaces.

5. A gear cutting tool comprising a rotary head and a plurality of annularly arranged cutting blades secured to the head and extending in the general direction of the axis of the head, certain of said blades projecting axially of the head beyond others of the blades and constituting bottom cutting blades, the remainder of said blades being side cutting blades, the bottom cutting blades being relieved on the sides and tips back of their front faces.

6. A gear cutting tool comprising a rotary head and a plurality of annularly arranged cutting blades secured to the head and extending in the general direction of the axis of the head, certain of said blades projecting axially of the head beyond others of the blades and constituting bottom cutting blades, and the remainder of the blades being side cutting blades, said bottom cutting blades having sides of positive pressure angle and being relieved on their sides and tips back of their front faces.

7. A gear cutting tool comprising a rotary head and a plurality of annularly arranged cutting blades secured to the head and extending in the general direction of the axis of the head, certain of said blades projecting axially of the head beyond the other blades and constituting bottom cutting blades, and the remainder of the blades being side cutting blades, said bottom cutting blades having sides of positive pressure angle but of smaller pressure angle, respectively, than the corresponding side cutting edges of the side cutting blades and said bottom cutting blades being relieved on their sides and tips back of their front faces.

8. A gear cutting tool comprising a rotary head and a plurality of annularly arranged cutting blades secured to the head and extending in the general direction of the axis of the head, alternate blades projecting axially of the head beyond the other blades and constituting bottom cutting blades, and alternate blades of the remaining blades being inside and outside cutting blades, respectively, and having their side cutting edges offset radially of the axis of the head inwardly and outwardly, respectively, with reference to the corresponding sides of the bottom cutting blades and said bottom cutting blades having sides of positive pressure angle but of smaller pressure angle than the corresponding side cutting edges of the side cutting blades and said bottom cutting blades being relieved on their sides and tips back of their front faces.

9. A gear cutting tool comprising a rotary head and a plurality of annularly arranged cutting blades secured to the head and extending in the general direction of the axis of the head, alternate blades projecting axially of the head beyond the other blades and constituting bottom cutting blades, and the remaining cutting blades being side cutting blades and having their opposite side cutting edges offset radially of the axis of the head inwardly and outwardly, respectively, with reference to the corresponding sides of the bottom cutting blades, said bottom cutting blades having sides of positive pressure angle and being relieved on their sides and tips back of their front faces.

10. A gear cutting tool comprising a rotary head and a plurality of annularly arranged cutting blades which project beyond one side face of the head in the general direction of the axis of the head, certain of said blades projecting axially of the head beyond the other blades and constituting bottom cutting blades and the remainder of said blades being side cutting blades, each of said bottom cutting blades being relieved on its sides and tip back of its front face and having side surfaces which diverge from the tip of the blade to the body portion thereof.

11. A gear cutting tool comprising a rotary head and a plurality of cutting blades, certain of the blades being bottom cutting blades and being of greater height than the other blades and the remaining blades being side cutting blades and having their side cutting edges offset to either side of the corresponding sides of the bottom cutting blades, both the bottom cutting and side cutting blades having side surfaces of positive pressure angle, and the bottom cutting blades having both sides and tips relieved back of their front faces.

12. A gear cutting tool comprising a rotary head and a plurality of cutting blades, certain of the blades being bottom cutting blades and being of greater height than the other blades and the remaining blades being side cutting blades and having their side cutting edges offset to either side of the corresponding sides of the bottom cutting blades, both the bottom cutting and the side cutting blades having side surfaces of positive pressure angle and the pressure angle of the sides of the bottom cutting blades being less than the pressure angle of the sides of the side cutting blades, and the bottom cutting blades having both their sides and tips relieved back of their front faces.

13. A gear cutting tool comprising a rotary head and a plurality of cutting blades, alternate blades projecting in height beyond the remainder of the blades and constituting bottom cutting blades, and the remainder of the blades being side cutting blades, said bottom cutting blades having sides of positive pressure angle and being relieved on their sides and tips back of their front faces.

14. A gear cutting tool comprising a rotary head and a plurality of cutting blades, alternate blades projecting in height beyond the remainder of the blades and constituting bottom cutting blades, and the remainder of the blades being side cutting blades, said bottom cutting blades having sides which are of positive pressure angle but of less pressure angle than the side cutting edges of the side cutting blades and said bottom cutting blades being relieved on their sides and tips back of their front faces.

15. A gear cutting tool comprising a rotary head and a plurality of annularly arranged cutting blades secured to the head and extending in the general direction of the axis of the head, alternate blades projecting axially of the head beyond others of the blades and having top cutting edges for cutting the bottom of a tooth slot, the remainder of the blades being side cutting blades and having opposite sides which project radially inwardly and outwardly, respectively, beyond corresponding sides of the bottom cutting blades, to cut the sides of said slot, each of said bottom cutting blades being relieved on its sides as well as its top to provide cutting clearance and the opposite sides of said bottom cutting blades having different pressure angles from the corresponding sides of the side-cutting blades.

16. A gear cutting tool comprising a rotary head and a plurality of annularly arranged cutting blades secured to the head and having their cutting portions projecting beyond one side face of the head in the general direction of the axis of the head, certain of the blades projecting axially beyond others of the blades and constituting bottom-cutting blades, the remainder of the blades being side-cutting blades, the side-cutting blades having side surfaces of straight profile and positive pressure angle and the bottom-cutting blades having side surfaces which are also of straight profile and of positive pressure angle but of smaller pressure angle than the corresponding side surfaces of the side-cutting blades, both the side and bottom-cutting blades having their side and top surfaces relieved back of their front faces.

17. A gear cutting tool comprising a rotary head and a plurality of annularly arranged cutting blades which are secured to the head and project beyond one side face of the head in the general direction of the axis of the head and are relieved on their side and top faces back of their front faces, certain of the blades being bottom-cutting blades and others side-cutting blades, each bottom-cutting blade having a portion projecting axially beyond the side-cutting blades whose opposite side surfaces are relieved and of smaller pressure angle than the corresponding side surfaces of the side-cutting blade.

18. A face-mill gear cutter comprising a rotary head and a plurality of annularly arranged cutting blades which project beyond one side face of the head in the general direction of the axis of the head and which are relieved on their tops and sides back of their front faces, the cutting edges of said blades constituting an effective cutting surface which is of straight profile and of positive pressure angle for the greater portion of its height and which is of positive but smaller pressure angle adjacent its tip.

19. A face-mill gear cutter comprising a rotary head and a plurality of annularly arranged side-cutting blades secured thereto, the cutting portions of said blades extending beyond the face of said head in the general direction of the axis of rotation of said head, some of the side-cutting edges of said blades having a positive pressure angle and straight profile and some of the side-cutting edges of said blades having a positive pressure angle of different and lesser pressure angle, the line of each of the first mentioned side-cutting edges intersecting the line of each of the second mentioned side-cutting edges when said lines are projected to a common radial plane.

ARTHUR L. STEWART.
ALLAN H. CANDEE.